United States Patent [19]
Brown et al.

[11] Patent Number: 5,089,566
[45] Date of Patent: Feb. 18, 1992

[54] COMPOSITIONS COMPRISING POLYPHENYLENE ETHER-POLYESTER COPOLYMERS FROM EPOXYTRIAZINE-CAPPED POLYPHENYLENE ETHERS

[75] Inventors: Sterling B. Brown, Schenectady; Richard C. Lowry, Saratoga, both of N.Y.

[73] Assignee: General Electric Company, Schenectady, N.Y.

[21] Appl. No.: 351,903

[22] Filed: May 15, 1989

Related U.S. Application Data

[63] Continuation-in-part of Ser. No. 210,266, Jun. 23, 1988, abandoned.

[51] Int. Cl.$^5$ .................. C08L 71/12; C08L 77/12
[52] U.S. Cl. .................... 525/396; 525/68; 525/92; 525/397; 525/905
[58] Field of Search ............ 525/396, 397, 905

[56] References Cited

U.S. PATENT DOCUMENTS

| | | | |
|---|---|---|---|
| 4,732,937 | 3/1988 | Sybert | 525/396 |
| 4,895,945 | 1/1990 | Bown et al. | 544/218 |

*Primary Examiner*—Jacob Ziegler
*Attorney, Agent, or Firm*—William H. Pittman; James C. Davis, Jr.

[57] ABSTRACT

Copolymer-containing compositions are prepared by the reaction of an epoxytriazine-capped polyphenylene ether with another polymer containing carboxy end groups, especially a polyester. The compositions have excellent properties and find utility as molding compositions and as compatibilizers for blends of similar polymers. Suitable epoxytriazine-capped polyphenylene ethers may be prepared by reaction of a polyphenylene ether with an epoxychlorotriazine such as diglycidyl chlorocyanurate, n-butyl glycidyl chlorocyanurate or mesityl glycidyl chlorocyanurate.

11 Claims, No Drawings

COMPOSITIONS COMPRISING POLYPHENYLENE ETHER-POLYESTER COPOLYMERS FROM EPOXYTRIAZINE-CAPPED POLYPHENYLENE ETHERS

This application is a continuation-in-part of copending application Serial No. 210,266, filed June 23, 1988, now abandoned.

This invention relates to the preparation of polyphenylene ether-polyester copolymers.

The polyphenylene ethers are a widely used class of thermoplastic engineering resins characterized by excellent hydrolytic stability, dimensional stability, toughness, heat resistance and dielectric properties. However, they are deficient in certain other properties such as workability and solvent resistance. Therefore, there is a continuing search for means for modifying polyphenylene ethers to improve these other properties.

A disadvantage of the polyphenylene ethers which militates against their use for molding such items as automotive parts is their low resistance to non-polar solvents such as gasoline. For increased solvent resistance, it would be desirable to form compositions in which polyphenylene ethers are combined with resins which have a high degree of crystallinity and therefore are highly resistant to solvents. Illustrative of such resins are the thermoplastic polyesters including poly(alkylene dicarboxylates), especially the poly(alkylene terephthalates). Other reasons exist for forming compositions comprising polyphenylene ethers and other polymers containing carboxy end groups, especially such polyesters as polyarylates and elastomeric polyesters.

However, polyphenylene oxide-polyester blends frequently undergo phase separation and delamination. They typically contain large, incompletely dispersed polyphenylene ether particles and no phase interaction between the two resin phases. Molded parts made from such blends are typically characterized by extremely low impact strength, brittleness, delamination and the like.

Numerous methods for compatibilizing polyphenylene ether-polyester compositions have been developed. For example, PCT published application 87/850 describes blends compatibilized by the addition of an aromatic polycarbonate. Said blends are extremely versatile in numerous critical applications such as the fabrication of automobile body parts. However, the presence of polycarbonate may result in degradation of certain other properties such as heat distortion temperature.

In addition, a problem sometimes arises by virtue of the presence of aminoalkyl-substituted end groups on certain commercially available polyphenylene ethers, as described in more detail hereinafter. For optimum impact strength, it is frequently necessary to remove said aminoalkyl-substituted end groups and other amine constituents frequently present as impurities in the polyphenylene ether. Such expedients as the use of amine quenchers and/or vacuum venting of the polyphenylene ether are effective in decreasing amino nitrogen content, but add a step to the processing operation which may be undesirable under certain circumstances.

Various methods are also known for preparing copolymers of polyphenylene ethers with polyesters. Such copolymers are often effective as compatibilizers for blends of the same resins. To facilitate copolymer formation, it is frequently advisable to employ a polyphenylene ether containing functional groups. For example, epoxy groups can react with such nucleophilic groups in polyesters and polyamides as amino, hydroxy and carboxy groups, leading to copolymer formation.

Several methods of preparing epoxy-functionalized polyphenylene ethers are disclosed in various patents and publications. For example, U.S. Pat. No. 4,460,743 describes the reaction of a polyphenylene ether with epichlorohydrin, to produce an epoxy-functionalized polymer. However, this method requires dissolution of the polyphenylene ether in a large excess of epichlorohydrin, a relatively expensive reagent which is also a strong skin irritant and can cause kidney injury.

PCT published application 87/7279 describes the reaction of polyphenylene ethers with terephthaloyl chloride and glycidol to form an epoxy-functionalized polyphenylene ether useful, for example, for the preparation of copolymers with polyesters, but copolymer formation with polyesters by this method requires a solution reaction in relatively expensive and high boiling solvents such as trichlorobenzene and is very slow.

In the same application are described reactions of various epoxy-functionalized ethylenic monomers such as glycidyl acrylate, glycidyl methacrylate and allyl glycidyl ether with polyphenylene ethers in the presence of free radical initiators. The resulting epoxy-functionalized materials are useful as intermediates for the preparation of copolymers by melt reaction with polyamides. However, functionalization of the polyphenylene ether by this method most often requires large quantities of the monomer, and certain of such monomers, including glycidyl methacrylate, are toxic. Moreover, the reaction is generally accompanied by homopolymerization of the epoxy-functionalized monomer, and it is then necessary to remove the homopolymer by such complicated operations as dissolution of the crude polymeric product followed by formation and decomposition of a polyphenylene ether-methylene chloride complex. Thus, these materials may not be readily adaptable to copolymer preparation on an industrial scale.

The present invention provides compositions comprising polyphenylene ether-polyester copolymers formed from highly reactive epoxy-functionalized polyphenylene ethers which may be prepared under simple solution or interfacial conditions using relatively inexpensive reagents. Said compositions have excellent physical properties, particularly when blended with conventional impact modifiers for polyphenylene ethers. They also compatibilize blends containing unfunctionalized polyphenylene ethers.

Accordingly, the invention includes compositions comprising polyphenylene ether- copolymers prepared by the reaction of an epoxytriazine-capped polyphenylene ether with at least one condensation polymer containing carboxy end groups.

Epoxytriazine-capped polyphenylene ethers suitable for use in the preparation of the compositions of this invention, as well as methods for their preparation, are disclosed and claimed in copending, commonly owned application Ser. No. 351,905, filed May 15, 1989. They comprise polymer molecules having end groups of the formula

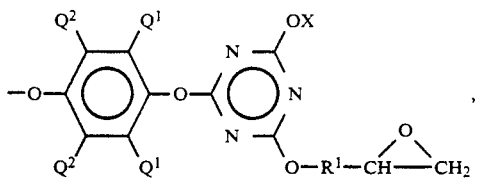

(I)

wherein:
each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms;
each $Q^2$ is independently hydrogen, halogen, primary or secondary lower alkyl, phenyl, haloalkyl, hydrocarbonoxy or halohydrocarbonoxy as defined for $Q^1$;
X is an alkyl, cycloalkyl or aromatic radical or

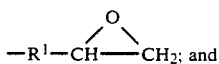

(II)

$R^1$ is a divalent aliphatic, alicyclic, heterocyclic or unsubstituted or substituted aromatic hydrocarbon radical.

Said epoxytriazine-capped polyphenylene ethers may be prepared as described hereinafter from the polyphenylene ethers known in the art. The latter encompass numerous variations and modifications all of which are applicable to the present invention, including but not limited to those described hereinafter.

The polyphenylene ethers comprise a plurality of structural units having the formula

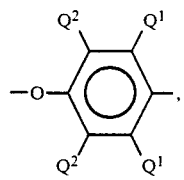

(III)

and in each of said units independently, each $Q^1 Q^2$ is as suitable as $Q^1$ and $Q^2$ are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and sec-butyl and 3-pentyl. Preferably, any alkyl radicals are straight chain rather than branched. Most often, each $Q_1$ is alkyl or phenyl, especially $C_{1-4}$ alkyl, and each $Q_2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be employed for the purposes of this invention include those which comprise molecules having at least one of the end groups of the formulas

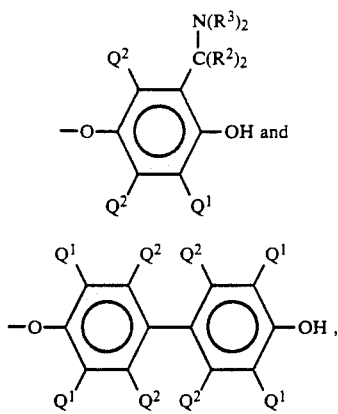

(IV)

(V)

wherein $Q^1$ and $Q^2$ are as previously defined; each $R^2$ is independently hydrogen or alkyl, with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula IV are typically obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals The principal site of reaction is the $Q^1$ radical adjacent to the hydroxy group on the terminal unit of the polymer chain. During further processing and/or bending, the aminoalkyl-substituted end groups may undergo various reactions, probably involving a quinone methide-type intermediate of the formula

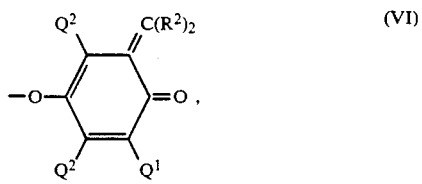

(VI)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula V are often especially useful in the present invention. They are typically obtained from reaction mixtures in which a by-product diphenoquinone of the formula

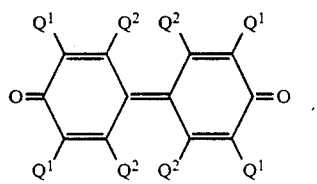

(VII)

is present, especially in a copper-halide-secondary-or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the 90% by weight of the polymer, contain end groups having one frequently both of formulas IV and V. It should be understood, however, that other end groups may be present and that the invention in its broadest sense may not be dependent on the molecular structures of the polyphenylene ether end groups. It is, however, required that a substantial proportion of free, non-hydrogen bonded hydroxy groups be present; that is, that a substantial proportion of hydroxyterminated end groups have structures other than that of formula IV.

The use of polyphenylene ethers containing substantial amounts of unneutralized amino nitrogen may afford compositions with undesirably low impact strengths. The possible reasons for this are explained hereinafter. The amino compounds include, in addition to the aforementioned aminoalkyl end groups, traces of amine (particularly secondary amine) in the catalyst used to form the polyphenylene ether.

The present invention therefore includes the use of polyphenylene ethers in which a substantial proportion of amino compounds has been removed or inactivated. Polymers so treated contain unneutralized amino nitrogen, if any, in amounts no greater than 800 ppm. and more preferably in the range of about 100-800 ppm.

A preferred method of inactivation is by extrusion of the polyphenylene ether at a temperature within the range of about 230°-350° C., with vacuum venting. This is preferably achieved in a preliminary extrusion step, by connecting the vent of the extruder to a vacuum pump capable of reducing the pressure to about 200 torr or less. There may also be advantages in employing vacuum venting during extrusion of the composition of this invention.

It is believed that this inactivation method aids in the removal by evaporation of any traces of free amines (predominantly secondary amines) in the polymer, including amines generated by conversion of aminoalkyl end groups to quinone methides of the type represented by formula VI.

It will be apparent to those skilled in the art from the foregoing that the polyphenylene ethers contemplated for use in the present invention include all those presently known, irrespective of variations in structural units or ancillary chemical features.

The end groups on the epoxytriazine-capped polyphenylene ethers have formula I, in which $Q^1$ and $Q^2$ are as previously defined. X may be an alkyl or cycloalkyl radical, typically lower alkyl and especially primary or secondary lower alkyl; an aromatic radical, typically monocyclic and containing 6-10 carbon atoms and especially an aromatic hydrocarbon radical; or a radical of formula II. In formulas I and II, $R^1$ may be aliphatic, alicyclic, aromatic (including aromatic radicals containing art-recognized substituents) or heterocyclic. It is usually lower alkylene and especially methylene.

The above-described epoxytriazine-capped polyphenylene ether compositions may be prepared by contacting under reactive conditions, in the presence of a basic reagent, at least one polyphenylene ether with an epoxychlorotriazine of the formula

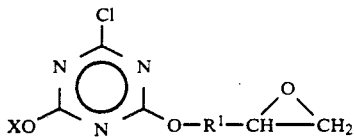 (VIII)

wherein $R^1$ and X are as previously defined.

Typical epoxychlorotriazines of formula VIII include 2-chloro-4,6-diglycidoxy-1,3,5-triazine (hereinafter "DGCC"), 2-chloro-4-methoxy-6-glycidoxy-1,3,5-triazine, 2-chloro-4-(n-butoxy)-6-glycidoxy-1,3,5-triazine (hereinafter "BGCC") and 2-chloro-4-(2,4,6-trimethylphenoxy)-6-glycidoxy1,3,5-triazine (hereinafter "MGCC"). These compounds may also be named as though derived from cyanuric acid and DGCC, BGCC and MGCC may be designated diglycidyl chlorocyanurate, n-butyl glycidyl chlorocyanurate and 2,4,6-trimethylphenyl glycidyl chlorocyanurate, respectively. They may be prepared, for example, by the reaction of 2,4,6-trichlorotriazine (cyanuric chloride) with glycidol or combinations thereof with n-butanol or mesitol. Cyanuric chloride and n-butyl dichlorocyanurate are both commercially available.

Intermediates such as DGCC, BGCC and MGCC and the method for their preparation are disclosed and claimed in copening, commonly owned application Ser. No. 144,901, filed Jan. 19, 1988, now U.S. Pat. No. 4,895,945.

Their preparation is illustrated by the following examples.

EXAMPLE 1

To a mechanically stirred solution of 220.8 g. (1.2 moles) cyanuric chloride in 1500 ml. chloroform, cooled to 0°-10° C., was added 266.4 g. (3.6 moles) glycidol in one portion. Aqueous sodium hydroxide (50% solution; 192 g.) was added to the mixture dropwise with stirring over about 3 hours maintaining the reaction temperature below 10° C. and preferably around 0°-5° C. The reaction mixture was allowed to warm slowly to room temperature. The chloroform layer was washed with distilled water until neutral and dried over magnesium sulfate. The reaction product was found by carbon-13 nuclear magnetic resonance to be 2-chloro-4,6-diglycidoxy-1,3,5-triazine (DGCC). Analysis by liquid chromatography showed about 95% (by weight) chlorodiglycidoxytriazine. The reaction mixture also was found to contain small amounts of triglycidoxytriazine and dichloroglycidoxytriazine.

EXAMPLE 2

To a magnetically stirred solution of 250 g. (1.125 moles) n-butyl dichlorocyanurate in 757 ml. chloroform, cooled to 0°-10° C., was added 250 g. (3.375 moles) glycidol in one portion. Aqueous sodium hydroxide (50% solution; 90 g.) was added to the mixture dropwise with stirring over about 2 hours, maintaining the reaction temperature below 10° C. and preferably around 0°-5° C. The reaction mixture was allowed to warm to room temperature over 30 minutes. The chloroform layer was washed with distilled water until neutral and dried over magnesium sulfate. Proton nuclear magnetic resonance analysis indicated a 95% yield of 2-chloro-4-(n-butoxy)-6-glycidoxy-1,3,5-triazine (BGCC).

EXAMPLE 3

To a mechanically stirred solution of 50 g. (0.175 mole) 2,4,6-trimethylphenyl dichlorocyanurate (prepared by the reaction of equimolar amounts of mesitol and cyanuric chloride) in 170 ml. methylene chloride, cooled to 0°-10° C., was added 26.38 g. (0.356 mole) glycidol in one portion. Aqueous sodium hydroxide (50% solution; 14.26 g.) was added to the mixture dropwise with stirring over about 25 minutes maintaining the reaction temperature between 0° and 10° C. and preferably around 0°-5° C. After stirring an additional 30 minutes, the reaction mixture was allowed to warm to room temperature. The methylene chloride layer was washed with distilled water until neutral and dried over magnesium sulfate. The reaction product was found by proton nuclear magnetic resonance to be 2-chloro-4-(2,4,6-trimethylphenoxy)-6-glycidoxy-1,3,5-triazine (MGCC).

Various options are available for the reaction of the polyphenylene ether with the epoxychlorotriazine. In one method, the reaction is conducted in solution in a non-polar organic liquid, typically at a temperature in the range of about 80°-150° C. and preferably about 100°-125° C. The basic reagent employed in this method should be soluble in the organic liquid and is generally a tertiary amine. Its identity is not otherwise critical, provided it is sufficiently nonvolatile to remain in the reaction mixture at the temperatures employed. Pyridine is often preferred.

The amount of epoxychlorotriazine employed in this option is generally in the range of about 1-20% by weight, based on polyphenylene ether. The amount of basic reagent is an effective amount to promote the reaction; in general, about 1.0-1.1 equivalent thereof per mole of chloroepoxytriazine is adequate.

The epoxytriazine-capped polyphenylene ethers made in solution by the above-described process are generally found to contain rather high proportions (e.g., at least about 0.4% by weight) of chemically combined chlorine, principally covalently bound. It is believed that the covalently bound chlorine is the result of epoxy groups competing with the organic base as a hydrogen chloride acceptor, with the formation of chlorohydrin moieties. This may be followed by condensation of said chlorohydrin moieties with additional epoxy groups to produce such molecular species as polyphenylene ether-epoxytriazine block copolymers and homopolymeric epoxytriazine oligomers.

Upon molding, compositions containing polyphenylene ether copolymers prepared from products containing such species form articles which are ductile but have impact strengths somewhat lower than desired under certain conditions. This is particularly true of copolymers with polyesters.

A second, preferred method of preparation produces epoxytriazine-capped polyphenylene ethers with little or no covalently bound chlorine. In this method, the reaction is conducted interfacially in a medium comprising water and an organic liquid as previously described. The basic reagent is a water-soluble base, typically an alkali metal hydroxide and preferably sodium hydroxide. It may added to the mixture of epoxychlorotriazine and polyphenylene ether, or may initially react with the polyphenylene ether to form a salt which is then contacted with the epoxychlorotriazine. There is also employed a phase transfer catalyst. Any of such catalysts which are stable and effective under the prevailing reaction conditions may be used; those skilled in the art will readily perceive which ones are suitable. Particularly preferred are the tetraalkylammonium chlorides wherein at least two alkyl groups per molecule, typically 2 or 3, contain about 5-20 carbon atoms.

In this method, reaction temperatures in the range of about 20°-100° C. may be employed. The amount of epoxychlorotriazine is frequently lower than in the previously described method, typically in the range of about 1-6% and preferably about 2-6% by weight based on polyphenylene ether, since the reaction of the epoxychlorotriazine with the polyphenylene ether apparently proceeds more nearly to completion. Most often, the ratio of equivalents of base to moles of epoxychlorotriazine is about 0.5-5:1, and the weight ratio of phase transfer catalyst to polyphenylene ether is about 0.01-5.0:1.

Still another method utilizes an organic liquid and a solid base, typically a solid alkali metal hydroxide or an anion exchange resin in the free base form. Chloride salts may be removed by methods known in the art, including water washing when a hydroxide is employed and filtration when an anion exchange resin is employed.

Regardless of which method of preparation is used, the epoxytriazine-capped polyphenylene ether may be isolated by conventional methods, typically by precipitation with a non-solvent. Among the non-solvents which may be employed are methanol, 1-propanol, acetone, acetonitrile and mixtures thereof.

When the non-solvent is an alcohol, and especially methanol, it may undergo base-promoted reaction with the epoxytriazine moieties on the capped polyphenylene ether, usually resulting in a loss of epoxide groups. Either or both of two operations may be employed to suppress this reaction. The first is to neutralize the reaction mixture with any convenient acidic compound; carbon dioxide, in gaseous, liquid or solid form, is often preferred. The second is to remove alcohol from contact with the product as rapidly and completely as possible by conventional means, typically including a subsequent drying step.

In the following examples which illustrate the preparation of epoxytriazine-capped polyphenylene ethers, proportions of epoxychlorotriazine are expressed as a percentage of polyphenylene ether. The following polyphenylene ethers were employed:

PPE—a poly(2,6-dimethyl-1,4-phenylene ether) having an intrinsic viscosity in chloroform at 25° C. of 0.40 dl./g.

VV—PPE which had been extruded on a twin screw extruder within the temperature range of about 260°-320° C., with vacuum venting to a maximum pressure of about 20 torr.

LN—a poly(2,6-dimethyl-1,4-phenylene ether) having an intrinsic viscosity of 0.57 dl./g., having a low proportion of nitrogen as a result of preparation with a catalyst containing no primary or secondary amine.

Percentages of epoxytriazine in the capped polymer were determined from the relative areas of peaks in the nuclear magnetic resonance spectrum attributable to hydrogen atoms in the epoxy and aromatic moieties. Chlorine percentages were determined by quantitative X-ray fluorescence.

EXAMPLE 4–14

To solutions of 400 grams of polyphenylene ether in 2500 ml. of toluene were added, with stirring, various quantities of pyridine followed by various quantities of epoxychlorotriazines, added in portions. The ratio of equivalents of pyridine to moles of epoxychlorotriazine was 1.04:1. The solutions were heated under reflux for various periods of time, after which the products were precipitated with methanol in a blender, filtered, washed with methanol and vacuum dried. The relevant parameters and analytical results are given in Table I.

TABLE I

| Example | Polyphenylene ether | Epoxychlorotriazine Identity | % | Reaction time, hrs. | % epoxytriazine | % chlorine |
|---|---|---|---|---|---|---|
| 4 | PPE | DGCC | 5 | 2 | 0.52 | — |
| 5 | PPE | DGCC | 5 | 3 | 0.62 | — |
| 6 | VV | DGCC | 5 | 1 | 0.43 | 0.42 |
| 7 | VV | DGCC | 5 | 2 | 0.65 | — |
| 8 | VV | DGCC | 5 | 3 | 0.63 | 0.47 |
| 9 | VV | DGCC | 2.5 | 3.5 | 0.24 | — |
| 10 | VV | DGCC | 15 | 3 | 2.1 | 1.8 |
| 11 | VV | DGCC | 15 | 3 | 1.9 | — |
| 12 | VV | BGCC | 5 | 3 | 0.50 | — |
| 13 | VV | BGCC | 5 | 3 | 0.40 | — |
| 14 | VV | BGCC | 15 | 3 | 1.79 | — |

EXAMPLES 15–25

To solutions of 400 grams of polyphenylene ether in 2500 ml. of toluene were added various quantities of epoxychlorotriazines dissolved in a small amount of methylene chloride. There were then added 48 grams of a 10% solution in toluene of a commercially available methyltrialkylammonium chloride in which the alkyl groups contained 8-10 carbon atoms, and 10% aqueous sodium hydroxide solution in the amount of 1.3 equivalents of sodium hydroxide per mole of epoxychlorotriazine. The mixtures were stirred vigorously for various periods at 25°-40° C., after which the products were precipitated with methanol in a blender and rapidly filtered, washed with methanol and vacuum dried.

The results are given in Table II. Chlorine proportions were less than 200 ppm., the minimum detectable by quantitative X-ray fluorescence.

TABLE II

| Example | Polyphenylene ether | Epoxychlorotriazine Identity | % | Reaction time, min. | % epoxytriazine |
|---|---|---|---|---|---|
| 15 | PPE | DGCC | 1.5 | 30 | 0.52 |
| 16 | PPE | DGCC | 2.0 | 30 | 1.03 |
| 17 | PPE | DGCC | 2.5 | 30 | 0.95 |
| 18 | PPE | DGCC | 3.0 | 30 | 0.96 |
| 19 | PPE* | DGCC | 3.0 | 30 | 1.01 |
| 20** | PPE | DGCC | 3.0 | 30 | 1.24 |
| 21 | LN | DGCC | 3.0 | 30 | 0.48 |
| 22 | PPE | DGCC | 5.0 | 30 | 1.40 |
| 23 | VV | DGCC | 5.0 | 10 | 0.68 |
| 24 | PPE | BGCC | 3.0 | 30 | 1.25 |
| 25 | PPE | MGCC | 3.0 | 30 | 1.50*** |

*16% slurry of crude PPE in toluene.
**Reaction mixture neutralized with gaseous carbon dioxide.
***Average of 3 runs.

Any condensation polymer containing carboxy end groups may be employed in the present invention. Polyesters are particularly preferred. However, carboxy-terminated polymers containing linkages other than ester linkages, either alone or in combination with ester linkages, are included.

Such polymers are illustrated by various elastomeric polyesteramides, including block polyetheresteramides prepared by the reaction of a carboxyterminated polyamide with a polyoxyalkylene glycol such as polyethylene glycol, polypropylene glycol or polytetramethylene glycol. Typical carboxy-terminated polyamides are prepared by the polymerization of amino acids or lactams such as ξ-caprolactam, 11-aminoundecanoic acid and 12-aminododecanoic acid in the presence of a dicarboxylic acid such as adipic acid. A class of suitable block polyetheramides is sold by Atochem Inc. under the trade name PEBAX.

Also included are polyesteramides such as the material sold by Dow Chemical under the designation XUS63115. It is typically prepared by first forming a carboxyterminated polyester and subsequently effecting reaction of said polyester with an aromatic diisocyanate.

The polyesters, which are preferred, generally comprise structural units of the formula

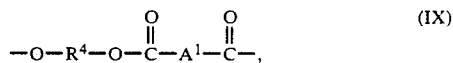

wherein each $R^4$ is independently a divalent aliphatic, alicyclic or aromatic hydrocarbon or polyoxyalkylene radical and $A^1$ is a divalent aromatic radical. They include thermoplastic polyesters illustrated by poly(alkylene dicarboxylates), elastomeric polyesters, polyarylates, and polyester copolymers such as copolyestercarbonates. Because the principal reaction which occurs with the epoxy groups in the capped polyphenylene ether involves a carboxylic acid group of the polyester, it is highly preferred that said polyester have a relatively high carboxylic end group concentration. Concentrations in the range of about 5–250 microequivalents per gram are generally suitable, with 10–100 microequivalents per gram being preferable, 30–100 being more preferable and 40–80 being particularly desirable.

The polyester may include structural units of the formula

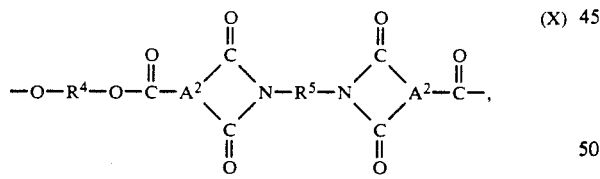

wherein $R^4$ is as previously defined, $R^5$ is a polyoxyalkylene radical and $A^2$ is a trivalent aromatic radical. The $A^1$ radical in formula IX is most often p- or m-phenylene or a mixture thereof, and $A^2$ in formula X is usually derived from trimellitic acid and has the structure

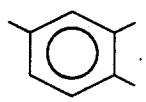

The $R^4$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 4 carbon atoms. As previously noted, this class of polyesters includes the poly(alkylene terephthalates) and the polyarylates. Poly(alkylene terephthalates) are frequently preferred, with poly(ethylene terephthalate) and poly(butylene terephthalate) being most preferred.

The polyester generally has a number average molecular weight in the range of about 20,000–70,000, as determined by intrinsic viscosity (IV) at 30° C. in a mixture of 60% (by weight) phenol and 40% 1,1,2,2-tetrachloroethane.

Either solution or melt blending procedures may be employed for the preparation of the copolymer compositions of this invention. Typical reaction temperatures are in the range of about 175°–350° C. Thus, relatively high boiling solvents such as o-dichlorobenzene, nitrobenzene or 1,2,4-trichlorobenzene are preferred for solution reactions.

Melt reaction procedures are frequently preferred because of the availability of melt blending equipment in commercial polymer processing facilities. Conventional equipment of this type is suitable, with the use of extrusion equipment generally being convenient and therefore often preferred.

The principal reaction which takes place between the epoxytriazine-capped polyphenylene ether and a polyester generally involves the carboxylic acid end groups of the latter, which open the epoxide rings to form hydroxy ester groups. Thus, a preferred embodiment of the invention is polyphenylene ether-polyester copolymers comprising molecules containing at least one polyphenylene ether-polyester linkage of the formula

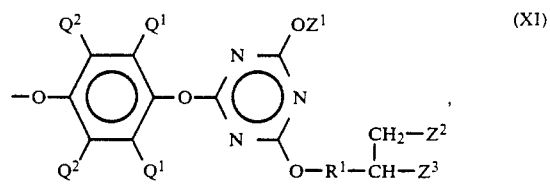

wherein $Q^1$, $Q^2$ and $R^1$ are as previously defined; $Z^1$ is an alkyl, cycloalkyl or aromatic radical (most often lower alkyl or aromatic hydrocarbon) or

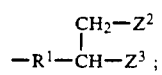

and $Z^2$ is OH and $Z^3$ is

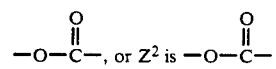

and $Z^3$ is OH.

Another possible reaction is between hydroxy end groups of the polyester and the epoxy groups of the capped polyphenylene ether. Thus, the compositions of the invention are not limited to compounds containing linkages of formula XI but may include compounds with linkages of similar structures containing ether moieties replacing the carboxylate moieties of $Z^2$ or $Z^3$.

The proportions of polyphenylene ether and other polymer employed for the preparation of the compositions of this invention are not critical; they may be widely varied to provide compositions having the desired properties. Most often, each polymer is employed in an amount in the range of about 5–95%, preferably about 30–70%, of the composition by weight.

In addition to polyphenylene ether-polyester copolymer, the compositions of this invention also contain unreacted polyphenylene ether. This will include any polyphenylene ether molecules having only hydrogen bonded end groups (i.e., the aminoalkyl-substituted end groups of formula IV), as well as other polyphenylene ether which is unfunctionalized as a result of incomplete capping or which is functionalized but fails to react with polyester. Said compositions may also contain unreacted polyester. In any event, molded parts produced from said compositions are generally ductile and have higher impact strengths than those produced from simple polyphenylene ether-polyester blends, which are incompatible and often exhibit brittleness or delamination as previously described.

Experimental data suggest that certain other factors are of importance in preparing compositions of maximum impact strength. One of these is the proportion of chlorine in the epoxytriazine-capped polyphenylene ether. Compositions of this invention prepared from high chlorine capped polyphenylene ethers, obtained by the solution method previously described, often have lower impact strengths than those prepared from the low chlorine materials obtained by the interfacial method.

Another factor is the proportion of unneutralized amino nitrogen in the polyphenylene ether. High proportions may cause side reactions, including opening of epoxide rings, displacement of epoxide groups from the cyanurate moiety and cleavage of ester linkages. Such side reactions can be minimized by vacuum venting the polyphenylene ether and/or the composition of this invention as previously described. A third factor is the molecular structure of the copolymer, which may vary with the molecular structure of the capping agent used (BGCC or MGCC as contrasted with DGCC) and its proportion.

It also appears that compositions containing "high chlorine" capped polyphenylene ethers have a greater tendency toward ductility and high impact strength when a polyphenylene ether containing a low proportion of unneutralized amino nitrogen is employed, while the opposite is true for "low chlorine" materials. The reason for this is not presently understood.

The compositions of this invention may contain other constituents in addition to the polyphenylene ether, other polymer and copolymer. Examples are impact modifiers compatible with either or both of the polyphenylene ether and the other polymer.

Suitable impact modifiers include various elastomeric copolymers, of which examples are ethylene-propylene-diene polymers (EPDM's), both unfunctionalized and functionalized with (for example) sulfonate or phosphonate groups; carboxylated ethylene-propylene rubbers; polymerized cycloalkenes; and block copolymers of alkenylaromatic compounds such as styrene with polymerizable olefins or dienes, including butadiene, isoprene, chloroprene, ethylene, propylene and butylene. Also included are core-shell polymers, including those containing a poly(alkyl acrylate) core attached to a polystyrene shell via interpenetrating network, and more fully disclosed in U.S. Pat. No. 4,681,915.

The preferred impact modifiers are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene end blocks and diene-derived midblocks. It is frequently advantageous to remove (preferably) or decrease the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652 and G1702.

The presence of such polymers as polycarbonates, copolyestercarbonates or polyarylates may have the effect of improving the impact strengths of molded articles under severe molding conditions, such as high molding temperatures and/or prolonged molding cycle times. The same purpose is frequently served by incorporating in the composition at least one other compound containing a plurality of epoxide moieties (hereinafter "polyepoxide"), generally in the amount of about 0.1–3.0 and preferably about 0.25–3.0% of the composition. Illustrative compounds of this type are homopolymers of such compounds as glycidyl acrylate and glycidyl methacrylate, as well as copolymers thereof, preferred comonomers being lower alkyl acrylates, methyl methacrylate, acrylonitrile and styrene. Also useful are epoxy-substituted cyanurates and isocyanurates such as triglycidyl isocyanurate.

The other polyepoxide may be introduced by blending with the other components in a single operation. However, its effectiveness may be maximized by preblending with the polyester, typically by dry mixing followed by extrusion. Such preblending frequently increases the impact strength of the composition. While the reason for the effectiveness of the other polyepoxide is not entirely understood, it is believed to increase molecular weight, melt viscosity and degree of branching of the polyester by reaction with carboxylic acid end groups of a portion of the polyester molecules.

Finally, there may be present conventional ingredients such as fillers, flame retardants, pigments, dyes, stabilizers, anti-static agents, crystallization aids, mold release agents and the like, as well as resinous components not previously discussed.

In the following examples illustrating the preparation and properties of copolymer compositions of this invention, the polyesters and impact modifiers employed are identified as follows:

PET—various poly(ethylene terephthalates).
PBT—a poly(butylene terephthalate) having a number average molecular weight of about 50,000, as determined by gel permeation chromatography.
PATME—a commercially available elastomeric polyterephthalate from a mixture of tetramethylene glycol, hexamethylene glycol and poly(tetramethylene ether) glycol.
PTME(50,000) and PTME(54,000)—a commercially available elastomeric polyterephthalates from mixtures of tetramethylene glycol and poly(tetramethylene ether) glycol, having the designated number average molecular weights and about 20% and 50% by weight, respectively, of poly(tetramethylene ether) glycol units.
PIE—a copolyester prepared from 1,4-butanediol and a 0.91:1 (by weight) mixture of dimethyl terephthalate and the diimide-diacid reaction product of trimellitic acid and a polyoxypropylenediamine having an average molecular weight of about 2000.

SEBS—a commercially available triblock copolymer with polystyrene end blocks having weight average molecular weights of 29,000 and a hydrogenated butadiene midblock having a weight average molecular weight of 116,000.

CS—a core-shell material containing 75% of a crosslinked poly(butyl acrylate) core and 25% of a crosslinked polystyrene shell, prepared in accordance with U.S. Pat. No. 4,684,696.

PO—a polyoctenylene with a cis-trans ratio of 20:80, having a weight average molecular weight of about 55,000.

The resinous blends described were prepared by dry mixing and extruded on a twin-screw extruder at 400 rpm. and 190°–255° C. (unless otherwise stated). The extrudates were quenched in water, pelletized, oven dried and molded at 280° C. into test specimens which were tested for notched Izod impact strength and tensile properties (ASTM procedures D256 and D638, respectively) and heat distortion temperature at 0.455 MPa. (ASTM procedure D648).

All parts and percentages in the following examples are by weight. The proportion of bound polyphenylene ether, where listed, was determined by extracting uncopolymerized polyphenylene ether with toluene and determining the proportion of polyphenylene ether in the residue by nuclear magnetic resonance spectroscopy; it is a general indication of the amount of copolymer in the composition.

EXAMPLES 26–35

Compositions containing various proportions of epoxytriazine-capped polyphenylene ethers prepared as described in Examples 4–14, various polyesters and SEBS were prepared and molded. The relevant parameters and test results are given in Table III.

TABLE III

| | Example | | | | | | | | | |
|---|---|---|---|---|---|---|---|---|---|---|
| | 26 | 27 | 28 | 29 | 30 | 31 | 32 | 33 | 34 | 35 |
| Capping agent | | | | | | | | | | |
| Identity | DGCC | DGCC | DGCC | DGCC | DGCC | DGCC | DGCC | BGCC | BGCC | BGCC |
| Percent | 5 | 5 | 5 | 5 | 5 | 5 | 5 | 5 | 5 | 15 |
| Capped polyphenylene ether | | | | | | | | | | |
| Polyphenylene ether reactant | VV | VV | VV | VV | VV | VV | VV | VV | VV | PPE |
| Percent epoxytriazine | 0.43 | 0.67 | 0.69 | 0.75 | 0.84 | 0.84 | 0.75 | 0.50 | 0.50 | 1.79 |
| Parts | 36 | 36 | 36 | 36 | 36 | 43 | 36 | 36 | 43 | 36 |
| Polyester | | | | | | | | | | |
| Identity | PBT | PBT | PBT | PBT | PBT | PBT | PTME (50,000) | PBT | PBT | PBT |
| Parts | 54 | 54 | 54 | 54 | 54 | 43 | 54 | 54 | 53 | 54 |
| SEBS, parts | 10 | 10 | 10 | 10 | 10 | 14 | 10 | 10 | 14 | 10 |
| Percent bound polyphenylene ether | 16 | 26 | 16 | — | 19 | 28 | >20 | 21 | 21 | 17 |
| Izod impact strength, joules/m. | 112 | 107 | 166 | 160 | 176 | 134 | 176 | 128 | 53 | 80 |
| Tensile strength, MPa. | | | | | | | | | | |
| At yield | — | 40.4 | 40.1 | 42.1 | — | — | 27.8 | — | — | — |
| At break | — | 37.5 | 37.5 | 37.3 | — | — | 29.7 | — | — | — |
| Tensile elongation, % | — | 76 | 115 | 109 | — | — | 151 | — | — | — |
| Heat distortion temp., °C. | — | 162 | — | 161 | — | — | 136 | — | — | — |

EXAMPLES 36–47

Compositions were prepared and molded from the epoxytriazine-capped polyphenylene ethers of Examples 15–25, PBT and SEBS. The relevant parameters and test results are given in Table IV.

TABLE IV

| Example | Capped polyphenylene ether Identity | Capped polyphenylene ether Parts | Polyester parts | SEBS, parts | Izod Impact strength, joules/m. | Tensile strength, MPa. At yield | Tensile strength, MPa. At break | Tensile elongation, % | Heat distortion temp., °C. |
|---|---|---|---|---|---|---|---|---|---|
| 36 | Ex. 15 | 36 | 54 | 10 | 107 | 46.4 | 39.0 | 52 | 176 |
| 37 | Ex. 16 | 36 | 54 | 10 | 742 | 45.5 | 42.7 | 187 | — |
| 38 | Ex. 17 | 36 | 54 | 10 | 689 | 47.7 | 42.0 | 142 | — |
| 39 | Ex. 18 | 36 | 54 | 10 | 833 | 45.3 | 45.1 | 212 | — |
| 40 | Ex. 19 | 36 | 54 | 10 | 790 | 42.5 | 42.6 | 160 | 170 |
| 41 | Ex. 20 | 36 | 54 | 10 | 1110 | — | — | — | — |
| 42 | Ex. 21 | 36 | 54 | 10 | 251 | 42.0 | 39.6 | 121 | — |
| 43 | Ex. 22 | 36 | 54 | 10 | 251 | 45.6 | 43.1 | 127 | 167 |
| 44 | Ex. 23 | 36 | 54 | 10 | 107 | 41.9 | 35.5 | 58 | 159 |
| 45 | Ex. 23 | 42 | 42 | 16 | 139 | 33.6 | 32.6 | 77 | 146 |
| 46 | Ex. 24 | 36 | 54 | 10 | 865 | 42.0 | 42.1 | 193 | 154 |
| 47 | Ex. 25 | 36 | 54 | 10 | 833 | 44.4 | 42.7 | 169 | — |

EXAMPLES 48–49

Compositions similar to those of Examples 18 and 24 were prepared and molded, substituting 18 parts of PPE for an equal weight of the epoxytriazine-capped polyphenylene ether. The relevant test results are given in Table V.

TABLE V

| | Example | |
|---|---|---|
| | 48 | 49 |
| Capped polyphenylene ether | Ex. 18 | Ex. 24 |

TABLE V-continued

| | Example | |
|---|---|---|
| | 48 | 49 |
| Izod impact strength, joules/m. | 48 | 64 |
| Tensile strength, MPa. | | |
| At yield | 44.7 | 44.2 |
| At break | 35.1 | 36.8 |
| Tensile elongation, % | 39 | 61 |

EXAMPLES 50-57

Compositions containing epoxytriazine-capped polyphenylene ethers, PET and (in Examples 50-55) SEBS were prepared and molded. In certain instances, the PET was first preextruded at 271° C. and dried in order to increase the proportion of carboxylic acid end groups. The following PET's were employed.

"Kodapak 7352" (Eastman Kodak Co.)
"Vituf 1001A" (Goodyear Chemical)
"Rohm & Haas 5202A"
Recycled bottle scrap, number average molecular weight about 40,000.

The relevant parameters and test results are given in Table VI.

TABLE VI

| | Example | | | | | | | |
|---|---|---|---|---|---|---|---|---|
| | 50 | 52 | 52 | 53 | 54 | 55 | 56 | 57 |
| Capped polyphenylene ether | | | | | | | | |
| Identity | Ex. 18 | Ex. 18 | Ex. 24 | Ex. 18 | Ex. 18 | Ex. 18 | Ex. 18 | Ex. 18 |
| Parts | 36 | 36 | 36 | 36 | 36 | 36 | 40 | 40 |
| PET | | | | | | | | |
| Identity | Kodapak | Kodapak* | Kodapak* | Vituf | Rohm & Haas | Bottle scrap | Kodapak* | Bottle scrap |
| Parts | 54 | 54 | 54 | 54 | 54 | 54 | 60 | 60 |
| SEBS, parts | 10 | 10 | 10 | 10 | 10 | 10 | — | — |
| Izod impact strength, joules/m. | 32 | 107 | 150 | 64 | 43 | 48 | — | — |
| Tensile strength, MPa. | | | | | | | | |
| At yield | 45.8 | 49.1 | 46.2 | 49.6 | 47.2 | 46.4 | 58.5 | 58.4 |
| At break | 35.9 | 41.9 | 45.6 | 41.2 | 42.4 | 40.9 | 51.8 | 50.4 |
| Tensile elongation, % | 106 | 208 | 253 | 152 | 214 | 178 | 272 | 237 |

*Reextruded.

EXAMPLES 58-61

Compositions containing the epoxytriazine-capped polyphenylene ether of Examples 18, PBT, bottle scrap PET and (in Examples 58-60) SEBS were prepared and molded. The relevant parameters and test results are given in Table VII.

TABLE VII

| | Example | | | |
|---|---|---|---|---|
| | 58 | 59 | 60 | 61 |
| Capped polyphenylene ether, parts | 36 | 36 | 36 | 40 |
| Polyester, parts | | | | |
| PBT | 45 | 27 | 9 | 30 |
| PET | 9 | 27 | 45 | 30 |
| SEBS, parts | 10 | 10 | 10 | — |
| Izod impact strength, joules/m. | 753 | 198 | 812 | — |
| Tensile strength, MPa. | | | | |
| At yield | 43.9 | 41.6 | 44.5 | 46.1 |
| At break | 42.3 | 40.8 | 39.6 | 40.6 |
| Tensile elongation, % | 151 | 220 | 195 | 178 |

EXAMPLES 62-64

Compositions containing the epoxytriazine-capped polyphenylene ethers similar to that of Example 18 but containing 0.75-0.85% epoxytriazine, PBT and CS or PO were prepared and molded. The relevant parameters and test results are given in Table VIII.

TABLE VIII

| | 62 | 63 | 64 |
|---|---|---|---|
| Capped polyphenylene ether, parts | 36 | 37 | 36 |
| PBT, parts | 54 | 55 | 54 |
| Impact modifier, parts | | | |
| CS | 10 | 8 | — |
| PO | — | — | 10 |
| Izod impact strength, joules/m. | 561 | 219 | 155 |
| Tensile strength, MPa. | | | |
| At yield | 46.7 | 44.7 | 41.9 |
| At break | 40.8 | 41.4 | 34.9 |
| Tensile elongation, % | 134 | 135 | 70 |
| Heat distortion temp., °C. | — | 156 | 162 |

EXAMPLES 65-74

Compositions containing epoxytriazine-functionalized polyphenylene ethers, various elastomeric polyesters and (in Examples 65-71) SEBS as an impact modifier were prepared and molded. The relevant parameters and test results are given in Table IX.

TABLE IX

| | Capped polyphenylene ether | | Polyester | | Impact modifier, parts | Izod impact strength, joules/m. | Tensile strength MPa. | | Tensile Elongation, % | Heat distortion temp., °C. |
|---|---|---|---|---|---|---|---|---|---|---|
| Example | Identity | Parts | Identity | Parts | | | At yield | At break | | |
| 65 | Ex. 18 | 36 | PTME (54,000) | 54 | 10 | * | — | 22.2 | 457 | — |
| 66 | Ex. 18 | 36 | PTME (50,000) | 54 | 10 | 870 | 33.1 | 34.6 | 196 | — |
| 67 | Ex. 18 | 36 | PATME | 54 | 10 | * | — | 13.5 | 130 | — |
| 68 | Ex. 18 | 36 | PIE | 54 | 10 | 160 | — | 14.1 | 84 | — |
| 69 | Ex. 24 | 36 | PTME (54,000) | 54 | 10 | * | 8.1 | 44.3 | 515 | — |

TABLE IX-continued

| Example | Capped polyphenylene ether Identity | Parts | Polyester Identity | Parts | Impact modifier, parts | Izod impact strength, joules/m. | Tensile strength MPa. At yield | Tensile strength MPa. At break | Tensile Elongation, % | Heat distortion temp., °C. |
|---|---|---|---|---|---|---|---|---|---|---|
| 70 | Ex. 24 | 36 | PTME (50,000) | 54 | 10 | 844 | — | 37.4 | 245 | — |
| 71 | Ex. 24 | 36 | PATME | 54 | 10 | * | — | 12.0 | 120 | — |
| 72 | Ex. 18 | 40 | PIE | 60 | — | — | 16.1 | 16.3 | 30 | — |
| 73 | Ex. 18 | 40 | PTME (54,000) | 60 | — | — | — | 26.2 | 548 | 62 |
| 74 | Ex. 18 | 40 | PTME (50,000) | 60 | — | — | 36.0 | 40.6 | 200 | 141 |

*Some or all parts bent but did not break.

EXAMPLES 75-80

Compositions containing the epoxytriazine-capped polyphenylene ether of Example 18, mixtures of PBT with various elastomeric polyesters, and (in Examples 75-79) SEBS as an impact modifier were prepared and molded. The relevant parameters and test results are given in Table X.

TABLE X

| | Example | | | | | |
|---|---|---|---|---|---|---|
| | 75 | 76 | 77 | 78 | 79 | 80 |
| Capped polyphenylene ether, parts | 36 | 36 | 36 | 36 | 20 | 20 |
| PBT, parts | 27 | 49 | 27 | 5 | 35 | 40 |
| Elastomeric polyester, parts | | | | | | |
| PTME (54,000) | 27 | — | — | — | — | — |
| PTME (50,000) | — | 5 | 27 | 49 | — | — |
| PIE | — | — | — | — | 35 | 40 |
| SEBS, parts | 10 | 10 | 10 | 10 | 10 | — |
| Izod Impact strength, joules/m. | 651 | 214 | 790 | 822 | 64 | — |
| Tensile strength, MPa. | | | | | | |
| At yield | 22.8 | 41.9 | 35.0 | 30.2 | 20.7 | 25.1 |
| At break | 25.5 | 38.9 | 36.8 | 36.5 | 19.0 | 19.5 |
| Tensile elongation, % | 131 | 118 | 144 | 226 | 39 | 37 |

EXAMPLE 81-86

Compositions were prepared by extrusion at 120°-290° C. from various proportions of an MGCC-capped polyphenylene ether prepared using 5% MGCC, three different grades of PEBAX block copolyetheramides and (in certain examples) impact modifier. The relative proportions and test results are given in Table XI. No delamination was observed.

TABLE XI

| | Example | | | | | |
|---|---|---|---|---|---|---|
| | 81 | 82 | 83 | 84 | 85 | 86 |
| Polyphenylene ether (MGCC-capped), % | 40 | 36 | 40 | 36 | 40 | 36 |
| Block polyetheramide, % | | | | | | |
| 2533SA | — | — | — | — | 60 | 54 |
| 4033SN | 60 | 54 | — | — | — | — |
| 6333SA | — | — | 60 | 54 | — | — |
| Impact modifier, % | — | 10 | — | 10 | — | 10 |
| Izod impact strength, joules/m. | — | 438 | — | 689 | — | * |
| Tensile strength, MPa. | | | | | | |
| At yield | — | — | — | 26.3 | — | — |
| At break | 21.9 | 21.3 | 31.9 | 35.9 | 13.9 | 14.1 |
| Tensile elongation, % | 240 | 224 | 167 | 214 | 585 | 568 |

*Did not break; too flexible.

EXAMPLES 87-91

The epoxytriazine-capped polyphenylene ethers employed in these examples were MGCC-capped products similar to that of Examples 81-86, prepared employing 3.5% and 5% MGCC. The other polymer was a polyesteramide prepared from azelaic acid, 1,4-butanediol and methylene bis(p-isocyanatobenzene), commercially available from Dow Chemical under the grade designation XUS 63115. The blending procedure was that employed in Examples 81-86.

The proportions and test results are given in Table XII, in comparison with two controls employing uncapped polyphenylene ethers. No delamination was observed.

TABLE XII

| | Ex. 87 | Control A | Ex. 88 | Control B | Ex. 89 | Ex. 90 | Ex. 91 |
|---|---|---|---|---|---|---|---|
| Polyphenylene ether, % | | | | | | | |
| Capped - 5% MGCC | 36 | — | 40 | — | 36 | — | — |
| Capped - 3.5% MGCC | — | — | — | — | — | 40 | 49 |
| PPE | — | 36 | — | 40 | — | — | — |
| Polyamide, % | | | | | | | |
| Polyamide-66 | — | — | — | — | — | — | 20.5 |
| Polyesteramide | 54 | 54 | 60 | 60 | 27 | 30 | 20.5 |
| PBT, % | — | — | — | — | 27 | 30 | — |
| Impact modifier, % | 10 | 10 | — | — | 10 | — | 10 |
| Izod impact strength, joules/m. | * | 64 | — | — | 700 | 256 | 182 |
| Tensile strength, MPa. | | | | | | | |
| At yield | — | — | — | — | 25.6 | — | — |
| At break | 37.2 | 16.4 | 34.9 | 14.2 | 34.9 | 36.2 | 36.2 |
| Tensile elongation, % | 393 | 82 | 430 | 81 | 185 | 178 | 91 |

*Did not break; too flexible.

What is claimed is:

1. A composition comprising polyphenylene ether-polyester copolymers prepared by the reaction of an epoxytriazine-capped polyphenylene ether with at least one condensation polymer containing carboxy end groups.

2. A composition according to claim 1 wherein the condensation polymer is an elastomeric copolyesteramide.

3. A composition according to claim 1 wherein the condensation polymer is a polyester comprising structural units of the formula

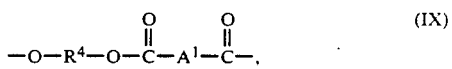

wherein each $R^4$ is independently a divalent aliphatic, alicyclic or aromatic hydrocarbon radical or polyoxyalkylene radical and $A^1$ is a divalent aromatic radical.

4. A composition according to claim 2 wherein the polyphenylene ether comprises a plurality of structural units having the formula

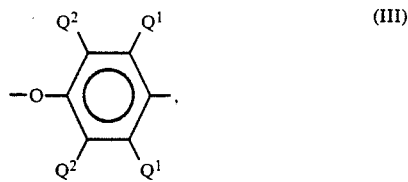

(III)

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

5. A composition according to claim 4 wherein $A^1$ is p- or m-phenylene or a mixture thereof.

6. A composition according to claim 5 wherein the polyphenylene ether is a poly(2,6-dimethyl-1,4-phenylene ether).

7. A composition according to claim 6 wherein $R^1$ is methylene and $A^1$ is p-phenylene.

8. A composition according to claim 7 wherein $R^4$ is ethylene.

9. A composition according to claim 7 wherein $R^4$ is tetramethylene.

10. A composition according to claim 7 wherein $R^4$ is polyoxytetramethylene.

11. A composition according to claim 7 wherein the polyester also contains units of the formula

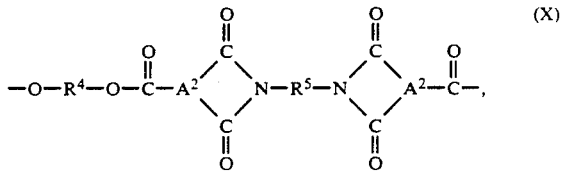

(X)

wherein $R^5$ is a polyoxyalkylene radical and $A^2$ is a trivalent aromatic radical.

* * * * *